May 24, 1949.    R. E. DODGE    2,471,100
DISPENSING APPARATUS
Filed Sept. 25, 1945    5 Sheets-Sheet 1
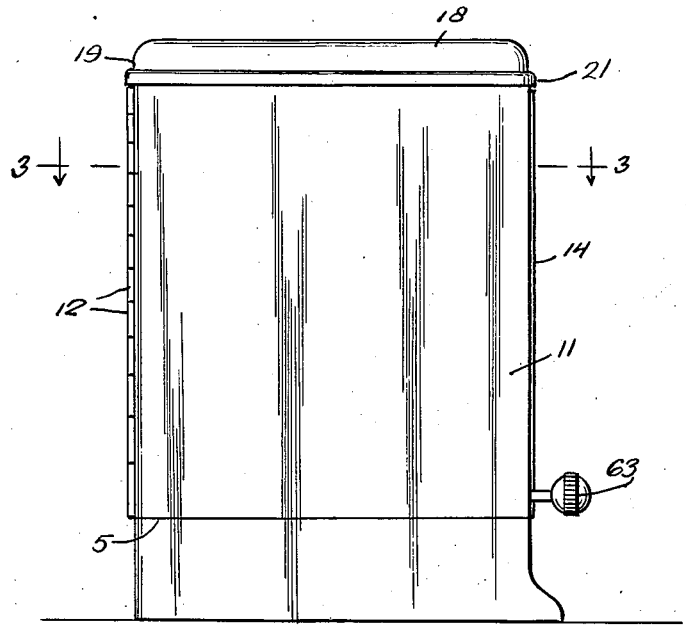
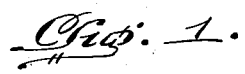
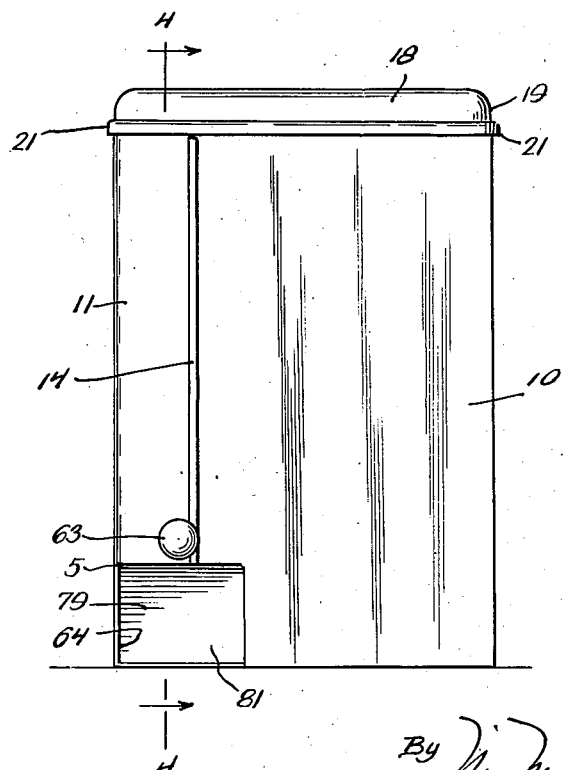
Inventor
Ralph E. Dodge,
By
Attorneys

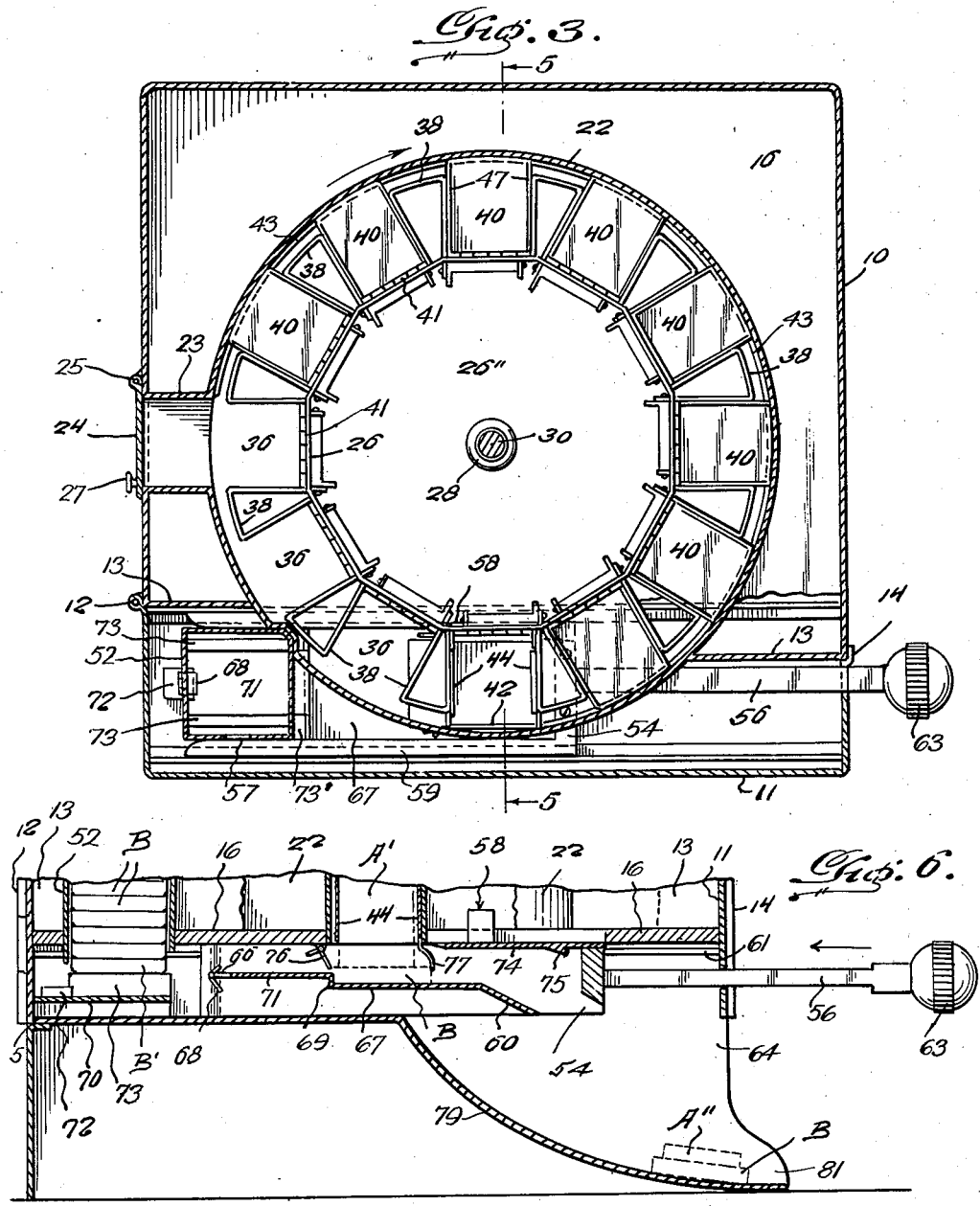

May 24, 1949. R. E. DODGE 2,471,100
DISPENSING APPARATUS
Filed Sept. 25, 1945 5 Sheets-Sheet 3

Inventor
Ralph E. Dodge,
By McMorrow, Berman & Davidson
Attorneys

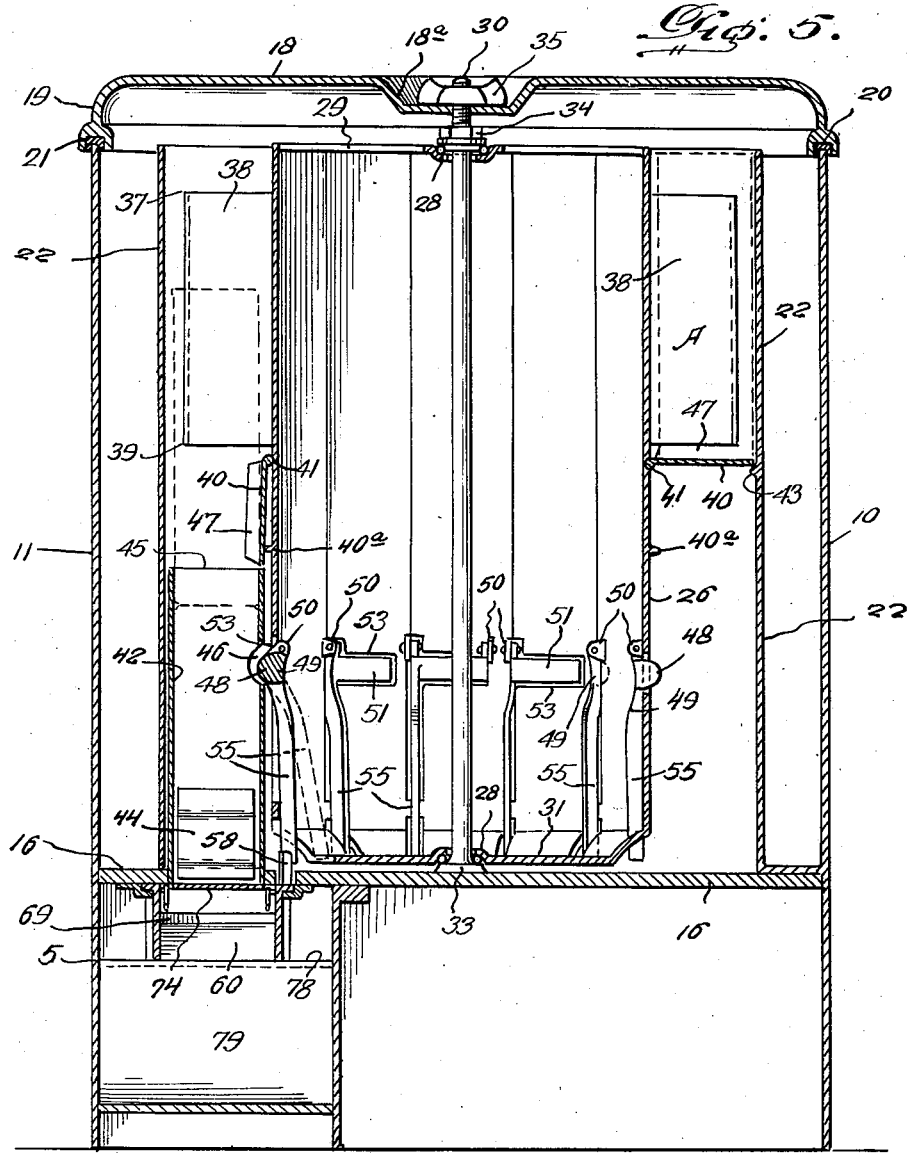

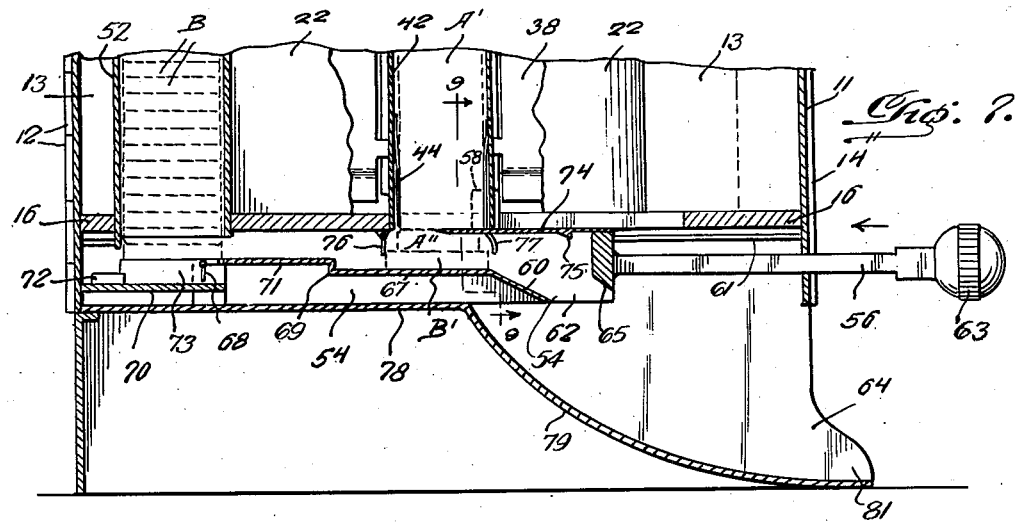
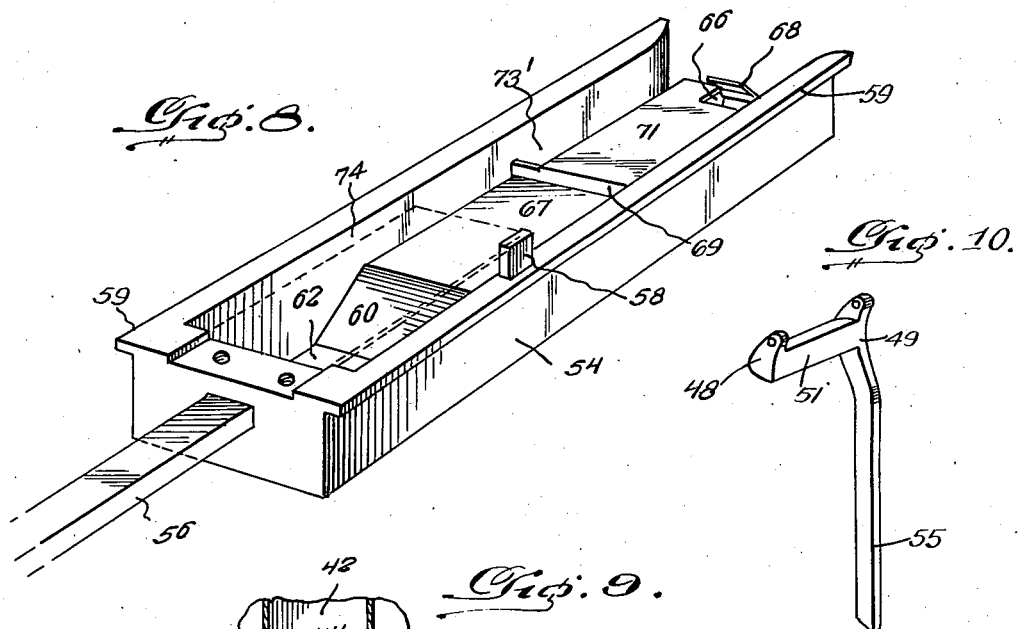
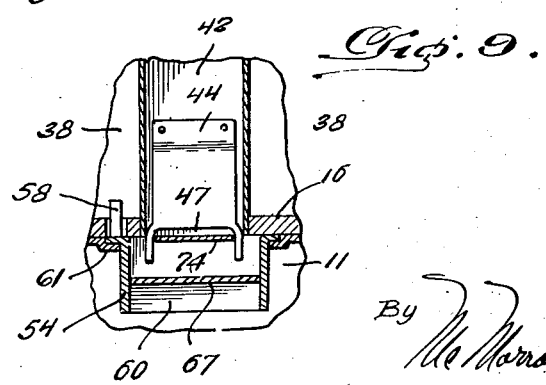

Patented May 24, 1949

2,471,100

UNITED STATES PATENT OFFICE 2,471,100

DISPENSING APPARATUS

Ralph E. Dodge, Clermont, Fla.

Application September 25, 1945, Serial No. 618,434

5 Claims. (Cl. 31—6)

This invention appertains to dispensing apparatus generally, and more particularly to one for dispensing uniform, individual servings of certain edible materials from a bulk supply of any one of such materials and in a manner that it will be kept fresh and free from contamination, until the supply is exhausted.

An object of the invention is to provide a dispensing apparatus of this kind, for dispensing individual servings of an edible material, such as butter or the like, in places where relatively large numbers of persons are to be fed, e. g., army and navy messes, hotels, restaurants and the like; an encased magazine being provided to receive a plurality of quarter-pound blocks, or sticks, of the butter, from which slices or patties are to be successively cut and deposited within a dish-like container, i. e., a chip, upon the manipulation of a combined cutting and delivery device or slide.

Another object of the invention has to do with the provision of a dispensing apparatus of the character mentioned, wherein the aforesaid magazine is rotatably mounted on a vertical axis within a casing and in a manner to have a major portion of its circumference surrounded by a space to receive a cooling medium, such as a supply of cracked ice, or a mechanical refrigerating unit.

With the foregoing and other objects and advantages in view, the invention resides in the certain new and useful combination, construction, and arrangement of parts, as will be hereinafter more fully described, set forth in the appended claims, and illustrated in the accompanying drawings, in which:

Figure 1 is a side elevation of a practical embodiment of the dispensing apparatus, in accordance with the invention;

Figure 2 is a front elevation;

Figure 3 is an enlarged, horizontal section, taken through the line 3—3 on Figure 1, looking in the direction of the arrows;

Figure 5 is a sectional view similar to that of Figure 4, but taken through the line 5—5 on Figure 3, looking in the direction of the arrows;

Figure 6 is a sectional view of the lower portion only of the apparatus as in Figure 4, and showing the cutting and delivery device, or slide, at the end of its initial operating stroke to place a chip in position beneath the cutting point of the butter sticks.

Figure 7 is a view similar to that of Figure 6, but showing the cutting and delivery device, or slide, at an intermediate point of its succeeding cutting stroke;

Figure 8 is a perspective view of the cutting and delivery device, or slide, per se;

Figure 9 is a fragmentary sectional detail, taken through the line 9—9 on Figure 7; and, Figure 10 is a perspective view of one of the triggers to effect the intermittent turning movement of the magazine to successively position the butter sticks at the point of cut and delivery of slices or patties from the apparatus.

Figure 4:
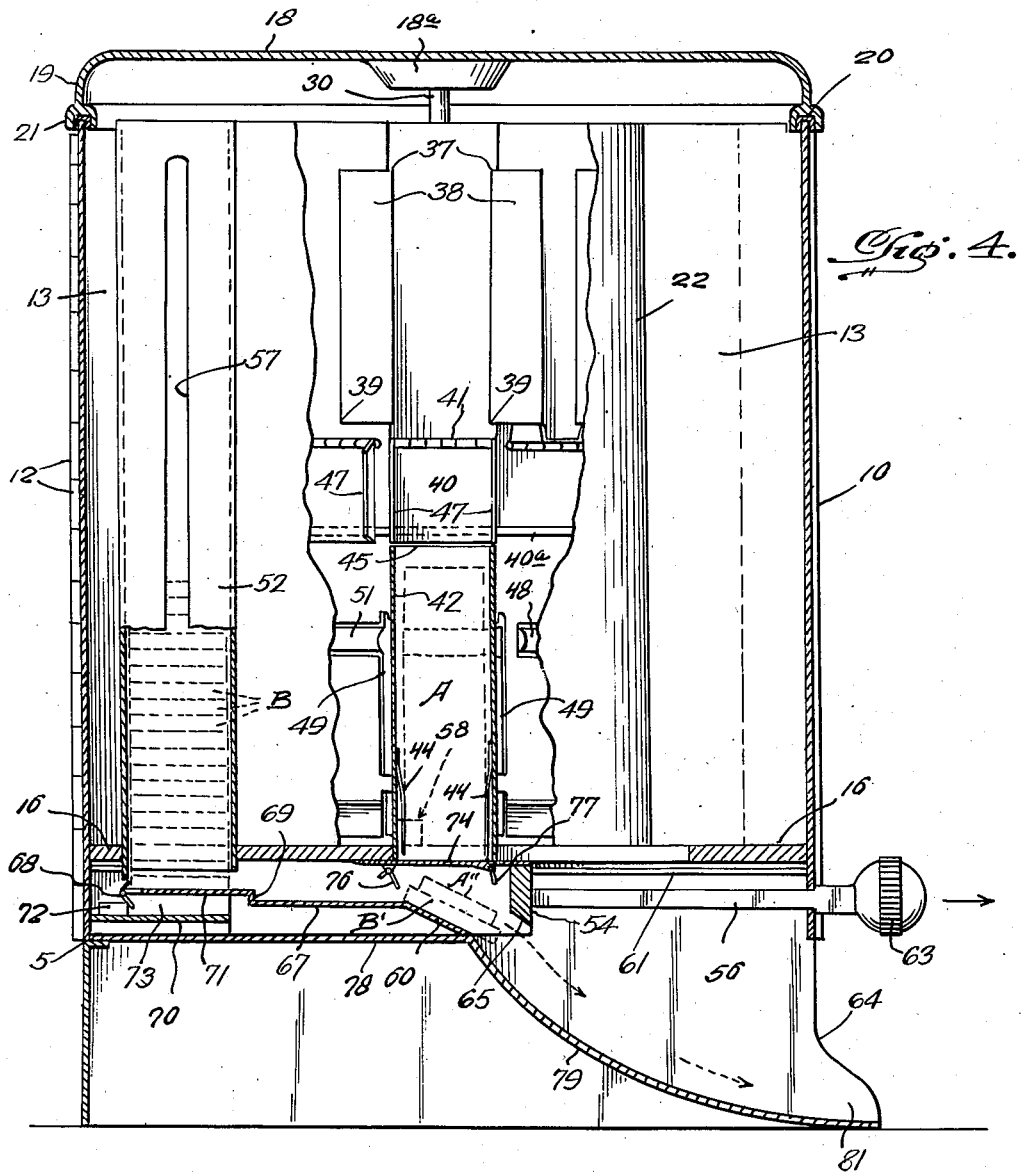
Figure 4 is an enlarged, vertical section, taken through the line 4—4 on Figure 2, looking in the direction of the arrows, and showing the butter cutting and delivery device, or slide, in its normal position of rest, following the completion of a previous cutting and delivery stroke.

Referring to the drawings, wherein like characters of reference denote corresponding parts in the several views, the invention, as it is exemplified therein, is comprised in a metal casing that is preferably rectangular in form and made in two sections 10 and 11, hinged together, as at 12, at the rear, the front of the section 11, being narrower than its rear and having a flange 14 at the front offset from its inner side edge to overlap the adjacent corner of the section 10, as best shown in Figures 1 and 3. The section 11 of the casing is in the form of a door having an outer side wall with extending flanges at the front and back and hinged at the back and overlapping the other section of the casing at the front. The section 11 extends from the upper edge of the casing downward to the point 5, as shown in Figure 1, 4 and 5. The main casing 10 has a bottom wall 16 spaced above the lower end thereof, as best shown in Figure 5; while the top sides of both sections 10 and 11 are enclosed with a common cover 18 which is provided with depending side flanges 19, having the lower edge thereof formed to provide a channel 21, to engage over the top edges of the casing 10 and door 11. A gasket 20 is fitted over the latter and seated within the chanel to form an air-tight joint therebetween.

Mounted eccentrically within the casing part 10, is a hollow cylindrical housing 22, which is equidistantly spaced from the front and rear walls thereof and has a portion disposed within the casing part 11, substantially as shown in Figure 3. Extending laterally from the upper portion of the housing 22, and opening through the rear wall of the casing part 10, is a throat 23, which is normally closed by an outwardly opening door 24, that is hinged, to the wall of the casing by a hinge 25, at the outer end and at one side of the throat opening 23. A knob 27 is provided on the outer side of the door to facilitate its opening and closing. The inner side of the casing part 10, at each side of the housing 22, is closed off by wall portions 13, so that the space within the casing part, between its walls and the housing, is made water-tight for the placing of a cooling medium therein.

Rotatably mounted within the housing 22, is a magazine to receive a number of the butter sticks A to be dispensed, and it is comprised in a hollow body 26, polygonal in form and having a top end wall 29 and a bottom end wall 31, each of which is formed with an inwardly depressed portion 28, of circular formation and centrally apertured for engagement with a stationary axle 30; the portions 28 constituting races for ball bearings 32. The lower end of the axle 30 is secured to the bottom wall 16 and is formed with a base 33 to provide a track for the ball bearings housed within the lower of the depressed portions 28; while its upper end is screw threaded and projects upwardly through an aperture in an inwardly depressed portion 18a, formed centrally of the cover 18, to receive a winged nut 35. Below the depression 18a, a bearing element 34 is carried on the screw threaded portion of the axle 30, to track the ball bearings carried in the upper of the depressions 28.

Formed on the outer side of the polygonal body 26 are compartments 36, corresponding in number to the number of the exterior peripheral vertical plane surfaces of the body, which open outwardly between vertically disposed partitions 38, secured to the rotatable body in line with the angular portions connecting the plane surfaces; each of the partitions being formed of a strip of sheet metal angularly bent to provide each compartment with parallel side walls. Hinged, as at 41, to the inner, or back, wall of each of the compartments 36, is a trap door 40, which is normally retained in a horizontal position, to support a butter stick A, inserted manually through the throat 23 and into a compartment above the same by a finger of the operator. The several trap doors 40 are hinged in a common plane above the upper end of the throat 23, so that access may be had through the throat to swing the doors to horizontal positions also by a finger of the operator, in which positions and as they move to the side of the throat, they are supported by having their outer edges slidably held on a bead 43 extending from the inner surface of the housing 22 and extending from a point at one side of the throat, for a major portion of the circumference of the housing to a point at the near side of the tubular chute 42 which allows the doors to drop to discharge the butter sticks, upon the successive release of the doors from the bead 43 caused by an intermittent rotary motion being imparted to the magazine, as will be hereinafter fully explained. Formed on the inner or back walls of the several compartments 36, below the hinges 41, are abutments 40a, which act to hold the trap doors 40, when pendent, spaced from said walls, to facilitate the engagement of a finger therewith to raise them to horizontal positions through the throat 23, as required, to support the butter sticks placed thereon. The partitions 38 extend from the point 37 to the point 39 providing radially positioned vertical compartments above the trap doors 40, so that an annular space is provided between the housing 22 and the magazine body 26, for clearance purposes.

Rising from an opening in the bottom wall 16, substantially midway between the front and rear ends of the casing part 11, and within the aforesaid annular space about the magazine body 26, is a rectangular-shaped tubular holder 42, which extends upward to a point 45 in a plane below the lower ends of the partitions 38, so that the ends of the compartments 36 will successively register therewith, for the deposit of the butter sticks A therein, when the magazine is intermittently rotated. The bead 43 terminates at the near side of the holder 42, in the direction of rotation of the magazine, and releases the trap doors 40, immediately upon the registering of a compartment 36 with the holder 42; each of the doors dropping to open position under the weight of a butter stick supported thereon. Secured within the holder 42, to the front and rear side walls thereof, is a pair of flat spring elements 44, which function to retain a butter stick A' temporarily within the holder and until a serving is to be cut therefrom. With the aligning of a compartment 36 with the tubular holder 42, and the release of the trap door 40, the butter stick drops past the door and into the holder 42; flanges 47 being provided along the opposite side edges of the door to guide the butter stick in its downward movement. Formed in the inner side wall of the holder 42, a short distance below the top edge thereof, is a horizontal slot 46, which has its ends opening through the front and rear side walls of the holder, for the engagement therein of a cam element 48, offset from the outer side of the horizontal arm 51 of an angled member or trigger 49, during each intermittent movement of the magazine. One member or trigger 49 is provided below each of the compartments 36 and each of the same has its horizontal arm 51 pivoted at its ends in ears 50, struck inwardly of the magazine body 26 from the opposite ends of a slot 53 formed in the latter; the cam element 48 projecting outwardly through the slot 53 to engage in the slot 46, during the movement of the magazine wherein one of the compartments 36 registers with the holder 42. Depending from one end of the horizontal arm 51, of each of the triggers 49, is a vertical arm 55, through the medium of which motion is imparted to the magazine in a manner to be presently explained. Also rising from an opening in the bottom wall 16, rearwardly from and in line with the tubular holder 42, is a second tubular holder 52 to receive a stack of butter chips B, which are to be removed individually from the bottom of the stack to a position beneath the holder 42, for the deposit therein of a slice or patty A'', cut from the lower end of the butter stick A' resident in the latter holder. A vertically elongated slot 57 is formed in the outer side wall of the chip holder 52, for inspection purposes as desired or necessary.

To perform the functions required for the delivery of individual servings of butter from the apparatus as thus constructed and arranged, a manually operable device is provided within the casing part 11 and it is comprised in an oblong frame 54, having laterally disposed flanges 59 formed along its longer sides, slidably engaged in trackways 61, fastened on the under side of the bottom wall 16. An actuating handle 56 extends horizontally from the front end of the frame and outwardly through the front wall of the casing part 11, above an exit opening for the butter servings; the free end of the handle 56 terminating in a hand grip or knob 63. By this arrangement, the frame 54 has fore and aft reciprocating movements imparted to it from the handle 56 and, in order to effect the required intermittent rotary movements of the magazine 26, to bring the next succeeding compartment 36 into position above the holder 42, it is provided with a lug or tongue 58, rising from the top of its inner side wall, which is movable with the frame in a path to push against the depending arm 55, of the trigger 49 associated with the now emptied compartment in line with the holder at the moment. As soon as the next compartment registers with the holder 42, the trap door 40 thereof is released from the bead 43 and allows the butter stick supported thereon to drop into the holder 42. In dropping, the butter stick contacts the cam element 48, causing the trigger 49 to swing on its pivots inwardly of the magazine body 26, to remove the arm 55 out of the path of the lug or tongue 58, so that the magazine 26 remains stationary during further movements of the frame 54 and until the butter stick A', within the holder 42, is cut away at its lower end sufficiently for its top end to clear the cam element 48. With the release of the cam element 48 from contact with the butter stick A', the trigger 49 swings back to its initial position, with its depending arm 55 disposed in the path of the lug or tongue 58.

Mounted within the frame 54, is a conveyor plate, having a downwardly sloping part 60 at its forward end, spaced inwardly from the front end wall of the frame to provide a discharge opening 62 therebetween and downwardly through which loaded butter chips gravitate to the aforesaid exit opening 64 in the lower side of the front end wall of the casing part 11, below the actuating handle 56. To provide a sufficient clearance, for the passage of the loaded butter chips downwardly of the sloping part 60, the lower edge of the front end wall of the frame 54 is beveled, as at 65, in a plane substantially parallel to the slope of the part 60. The sloping part 60 emerges from the forward end of a horizontal intermediate part 67, of the conveyor plate, which, in turn, has its rearwardly directed end connected by a riser 69 to the forward end of a higher horizontal part 71, the latter part having its opposite side edges cutaway to provide slots 73' between the same and the side walls of the frame 54, for purposes which will presently be apparent. The rear end edge of the conveyor plate part 71 is provided with a cutout 66, in which an angled follower 68 is transversely pivoted to engage behind the lowermost of the butter chips B, in the holder 52, when the frame 54 is moved to its rearmost position within the casing part 11. Spaced below the lower end of the butter chip holder 52 is a shelf 70 upon which is mounted a pair of spaced rails 73 to support the stack of butter chips B and to allow for the passage of the conveyor plate part 71 between the same, in the rearward movement of the frame 54, to receive the lowermost of the chips and carry it forward when it is withdrawn from the bottom of the stack. During the rearward movement of the frame 54, the angled follower 68 takes a position that its upper part is horizontally disposed within the confines of the cutout 66, so as to clear the lowermost of the chips B. As the frame 54 nears its extreme rearward movement, the lower angled part of the follower 68 strikes an abutment 72, mounted on the shelf 70, immediately in rear of the passage between the members 73, and is swung on its pivots to elevate the upper part behind the lowermost of the chips B. Thus, the lowermost of the chips B is displaced from the bottom of the stack and is carried on the conveyor plate part 71 to a position immediately beneath the butter stick holder 42, when the frame 54 is moved to its forward position within the casing part 11.

A cutting blade 74 is mounted flush in the top edge of the front end wall of the frame 54, the same extending rearwardly therefrom in overlying relation with respect to the conveyor plate parts 60 and 67 and has its end sharpened to provide a transversely extending cutting edge which, in a subsequent rearward movement of the frame 54, severs a slice or patty of a predetermined thickness from the lower end of the butter stick A' protruding from the lower end of the holder 42, the severed portion dropping into the chip B' previously placed beneath the holder 42 to that end. Secured on the under side of the cutting blade 74 is a wedge-shaped member 75, which enters the cut as it is being made by the blade and forcibly separates the cut portion or patty A'' from the remainder of the butter stick A', to assure of its deposit in the butter chip B'. To prevent the chip B' from being carried rearwardly from beneath the butter stick holder 42 and to otherwise hold it in position to pass from the intermediate conveyor plate part 67 onto the forward sloping conveyor plate part 60, during the rearward movement of the frame 54 to force the cutting blade 74 through the butter stick A', an abutment 76 is hinged to the lower side of the bottom wall 16 and engages behind the chip B', when the latter is in place beneath the butter stick holder 42.

Normally, a butter stick A' is held within the holder 42, by means of the springs 44, to provide a clearance for the positioning of a butter chip B' beneath the holder, but it is to be released to drop a position of rest within the chip, by the latter exerting a pushing action on a pair of tongues 77, depending from the opposite ends of the lower edge of the spring 44, at the front side of the holder, during the forward movement of the frame 54, to bring the chip B' into position beneath the holder. The conveyor plate may be made adjustable, in suitable manner, within the frame 54 and relatively to the lower end of the butter stick holder 42, in order to vary the thickness of the slice or patty to be cut from the butter stick A'. Upon the completion of the cutting of the butter stick A', farther rearward movement of the frame 54 causes the abutment 76 to force the loaded butter chip B' off from the conveyor plate part 67 and onto the sloping part 60, from whence it slides downward to the exit opening 64. Secured within the casing part 11, immediately below the sliding frame 54, is a second bottom wall 78, which extends horizontally forward from the rear end wall of the casing part 11 to a point beneath the butter stick holder 42, where it curves downwardly and forwardly, as at 79, to the lower side of the exit opening 64, from which it projects in the form of a supporting lip 81 to receive the loaded butter chips B', for convenience in their removal.

In operation, when the handle 56 is pushed inwardly of the casing part 11, the frame 54 is moved rearwardly within the casing part, the rear conveyor plate part 71 passing between the supporting members 73 and beneath the lowermost of the butter chips B, stacked within the holder 52. Here, the lower part of the angled follower 68 strikes against the abutment 72 and swings its upper part to vertical position behind the lowermost of the chips B'. On the forward movement of the frame 54, the follower 68 holds the butter chip B' on the conveyor plate part 71 until it is positioned beneath the butter stick holder 42. As the chip B' passes the abutment 76, the latter first swings clear of the chip and then drops back to its normal position behind the chip and, at the same time, the cutting blade 74 is drawn forwardly from beneath the holder 42. When the chip B' reaches the position under the holder 42, it contacts the tongues 77, depending from the lower edge of the spring 44 at the front side of the holder, releasing the pressure of the latter from the butter stick A', which immediately drops onto the chip. Now, when the handle 56 is again pushed inwardly of the casing part 11, to move the frame 54 in the rearward direction, the chip is held against a like movement on the conveyor plate part 71 by the abutment 76. With this movement of the frame 54, the cutting blade 74 acts to sever a serving from the lower end of the butter stick A' and, at the same time, the chip B' drops downward from the conveyor plate part 71 onto the intermediate plate part 67, thus allowing the cut serving of patty A" to separate from the portion of the butter stick remaining within the holder 42, which separation is assisted by the wedge-shaped member 75, on the lower side of the blade. As the frame 54 proceeds rearwardly, the loaded butter chip B' is pushed by the abutment 76 off from the intermediate conveyor plate part 67 and onto the forward sloping plate part 68, from whence it slides down the latter part and the curved portion 79 of the bottom wall 78, to a position of rest on the lip 81, for its subsequent removal therefrom. Access is to be had to the interior of the casing part 10, upon the removal of the winged nut 35 from the upper end of the axle 30 to free the cover 18 for its removal from the upper ends of bath casing parts 10 and 11. Also, access may be had to the interior of the casing part 11 additionally, by swinging the door or wall of the latter part outwardly from the casing part 10 on its hinge 12.

Without further description, it is thought to be obvious that I have provided a practical, comparatively simple, inexpensive and sanitary apparatus, for expeditiously dispensing uniform servings of butter, or a like substance or material, in hotels, restaurants, and the like, and which can be operated and serviced with a minimum of effort and waste, as compared to ordinary methods of handling edible substances or materials of this kind and the serving of the same by employees in dining rooms catering to large numbers of persons. Also, it is to be understood that, while I have illustrated and described my invention in specific detail, changes in the design thereof and in minor details of construction and arrangement of its parts may be resorted to, within such limitations that are determined by the scope of the appended claims.

What I claim is:

1. In a cutter and dispenser, the combination, which comprises a magazine having a plurality of vertically disposed radially positioned compartments in the periphery thereof, means rotatably mounting the magazine with the axis thereof vertically disposed, horizontally positioned doors carried by the magazine hinged in the lower ends of said compartments, a vertically positioned cylindrical casing surrounding said magazine, said casing having an inwardly extending bead horizontally positioned on the inner surface thereof to support said doors in horizontal position, a vertically disposed holder positioned to register with the lower ends of the compartments of the magazine alternately below the doors, a surrounding housing enclosing the magazine and casing providing an enclosed area for a refrigerant or the like, said housing having a throat extending from the exterior thereof through the cylindrical casing positioned to register with the compartments of the magazine respectively through which the compartments may be filled, the door-supporting bead on the inner surface of the casing extending from the far side of the throat to the near side of the vertically disposed holder wherein the doors drop to deposit products from the compartments into the holder, a slider positioned to travel inward and outward below the lower end of the holder having a handle extending from the exterior of the housing, a cutter on the slider, a plate-holding tube disposed in the path of said slider, means depositing a plate from the plate-holding tube on the slider as the slider is actuated, said slider adapted to position the plates below the lower end of the holder for receiving severed products therefrom, and a discharge chute positioned to receive products cut by the cutter of the slider extending to the exterior of the housing.

2. In a cutter and dispenser, the combination, which comprises a magazine having a plurality of vertically disposed radially positioned compartments in the periphery thereof, means rotatably mounting the magazine with the axis thereof vertically disposed, horizontally positioned doors carried by the magazine hinged in the lower ends of the compartments, a cylindrical casing surrounding said magazine, said casing having an inwardly extending bead supporting the outer ends of the doors, a vertically disposed holder positioned to register with the lower ends of the compartments of the magazine alternately below the doors, a surrounding housing enclosing the magazine and casing, said housing having a throat extending from the exterior thereof through the cylindrical casing positioned to register with the compartments of the magazine respectively through which the compartments may be filled, the door-supporting bead of the casing extending from the far side of the throat to the near side of the vertically disposed holder, a slider positioned to travel below the lower end of the holder having a handle extending from the exterior of the housing, a cutter on the slider adapted to sever products from the holder, a plate-holding tube disposed in the path of said slider, means depositing a plate upon the slider from the plate-holding tube as the slider is actuated, means actuating the magazine to position the next compartment over the holder by the slider as a product in the holder is exhausted, and a discharge chute positioned to receive products cut by the cutter of the slider extending to the exterior of the housing.

3. In an apparatus for dispensing individual servings of butter and the like, a casing, a magazine within said casing and adapted to be loaded with a number of sticks of butter, a dispensing holder mounted at one side of said magazine, means for moving said magazine relatively to said holder, means for discharging the butter sticks successively from the magazine into said holder, a second holder mounted within said casing and adapted to receive a stack of chips, a housing spaced from certain of the walls of said casing in which said magazine is enclosed providing an area for a cooling medium between the casing and housing, a throat extending from said housing and opening through a side wall of the casing for loading the magazine with a supply of the butter chips, a conveying and cutting slider mounted within said housing operable from the outside of the housing to perform the successive functions of moving a chip from the bottom of said second holder to a position beneath the dispensing holder, extending the butter stick within the dispensing holder and into the underlying chip, severing a serving from the extending end of the butter stick and moving the loading chip to position for discharge from the housing.

4. In an apparatus for dispensing individual servings of butter and the like, a casing, a magazine within said casing and adapted to be loaded with a number of sticks of butter, a dispensing holder mounted at one side of said magazine, means for moving said magazine relatively to said holder, means for discharging the butter sticks successively from the magazine into said holder, a second holder mounted within said casing and adapted to receive a stack of chips, an oblong frame mounted for sliding movement below and relatively to both of said holders, a conveyor plate mounted horizontally within said frame, a follower pivotally mounted at the rear end of said conveyor plate and adapted to engage the lowermost of the chips stacked within said second holder to move the same to a position beneath the dispensing holder, in the forward direction of movement of the frame, other means to subsequently cause the discharge of the loading chips from the forward end of the conveyor plate, and means operating said oblong frame from the outside of the casing to perform the successive movements of moving the chips from the bottom of the second holder to a position beneath the dispensing holder, extending the butter stick within the dispensing holder and into the underlying chips, severing a serving from the extending end of the butter stick, and moving the loading chips to position for discharge from the casing.

5. In an apparatus for dispensing individual servings of butter and the like, a casing, a magazine within said casing and adapted to be loaded with a number of sticks of butter, a dispensing holder mounted at one side of said magazine, means for moving said magazine relatively to said holder, means for discharging the butter sticks successively from the magazine into said holder, a second holder mounted within said casing and adapted to receive a stack of chips, a conveying and cutting slider mounted within said casing operable from the outside of the casing to perform the successive functions of moving a chip from the bottom of said second holder to a position beneath the dispensing holder, extending the butter stick within the dispensing holder and into the underlying chips, severing a serving from the extending end of the butter stick, and moving the loaded chip to position for discharge from the casing, said casing formed in two parts hinged together for lateral separation, said magazine being mounted within one of said casing parts and having a portion projecting through an opening in the inner side wall thereof and into the other of said casing parts, and the dispensing means mounted within said other casing part, said other casing part having an exit for the loaded chips in its front end wall below said dispensing means.

RALPH E. DODGE.

REFERENCES CITED

The following references are of record in the file of this patent:

UNITED STATES PATENTS

| Number | Name | Date |
| --- | --- | --- |
| 1,146,972 | Straight | July 20, 1915 |
| 1,253,602 | Kavagas et al. | Jan. 15, 1918 |
| 1,407,759 | Knox | Feb. 28, 1922 |
| 1,679,583 | Ninnis | Aug. 7, 1928 |